(12) United States Patent
Van Groenestijn et al.

(10) Patent No.: US 7,442,359 B2
(45) Date of Patent: Oct. 28, 2008

(54) RECOVERY OF SULPHURIC ACID

(75) Inventors: Johannes Wouterus Van Groenestijn, Apeldoorn (NL); Jacob Hendrik Obbo Hazewinkel, Zoetermeer (NL); Raymond Johannes Maria Creusen, Amersfoort (NL); Koen Peter Henri Meesters, Amersfoort (NL)

(73) Assignee: Nederlandse Organisatie voor Toegepast-Natuurwetenschappelijk Onderzoek TNO, Zoetermeer (NL)

( * ) Notice: Subject to any disclaimer, the term of this patent is extended or adjusted under 35 U.S.C. 154(b) by 0 days.

(21) Appl. No.: 11/837,111

(22) Filed: Aug. 10, 2007

(65) Prior Publication Data

US 2008/0025911 A1    Jan. 31, 2008

Related U.S. Application Data

(63) Continuation of application No. PCT/NL2006/000074, filed on Feb. 13, 2006.

(30) Foreign Application Priority Data

Feb. 11, 2005    (EP)    ................................. 05075350

(51) Int. Cl.
*B01D 61/00*    (2006.01)
*C01B 17/90*    (2006.01)

(52) U.S. Cl. ................. 423/522; 423/525; 423/531; 210/641; 210/651; 210/749; 210/767; 127/1; 127/36; 127/37

(58) Field of Classification Search .................. 127/1, 127/36, 37; 423/522, 525, 531; 210/641, 210/651, 749, 767
See application file for complete search history.

(56) References Cited

U.S. PATENT DOCUMENTS

| | | | |
|---|---|---|---|
| 2,276,210 A | 3/1942 | Lane et al. | 210/62 |
| 3,244,620 A | 4/1966 | Hansen et al. | 210/22 |
| 4,608,245 A * | 8/1986 | Gaddy et al. | 423/531 |
| 5,562,777 A | 10/1996 | Farone et al. | 127/37 |
| 5,580,389 A | 12/1996 | Farone et al. | 127/46.2 |
| 6,432,276 B1 * | 8/2002 | Lightner | 203/49 |
| 6,692,578 B2 * | 2/2004 | Schmidt et al. | 127/37 |
| 2004/0222157 A1 | 11/2004 | Minhas et al. | 210/651 |
| 2008/0041366 A1 * | 2/2008 | Wahnon | 127/37 |

* cited by examiner

*Primary Examiner*—Timothy C Vanoy
(74) *Attorney, Agent, or Firm*—Banner & Witcoff, Ltd.

(57) ABSTRACT

The invention is directed to a process for the recovery of sulphuric acid from a mixture comprising sulphuric acid and hydrocarbons, in particular carbohydrates. In accordance with the present invention the mixture comprising sulphuric acid and carbohydrates, is contacted with an anion selective membrane, thus producing a sulphuric acid rich filtrate stream and a stream depleted in sulphuric acid.

8 Claims, 1 Drawing Sheet

RECOVERY OF SULPHURIC ACID

RELATED APPLICATIONS

This application is a continuation of PCT application no. PCT/NL2006/000074, designating the United States and filed Feb. 13, 2006; which claims the benefit of the filing date of European application no. 05075350.8, filed Feb. 11, 2005; each of which is hereby incorporated herein by reference in its entirety for all purposes.

FIELD

The invention is directed to a process for the recovery of sulphuric acid from a mixture comprising sulphuric acid and organic matter from biomass.

BACKGROUND

Sulphuric acid is used for many different industrial purposes. One application of sulphuric acid is for the treatment of raw biomass, such as wood or grass, so that in a subsequent step it may be subjected to hydrolysis, to set free the hydrocarbons, in particular carbohydrates (sugars) such as hexose and pentose, which then may be converted to useful products, e.g. in a fermentation step.

Cellulose makes up the major part of all plant biomass. The source of all cellulose is the structural tissue of plants. It occurs in close association with hemicellulose and lignin, which together comprise the major components of plant fiber cells. This complex of cellulose, hemicellulose and lignin is usually referred to as lignocellulose. Cellulose consists of long chains of beta glucosidic residues linked through the 1,4 positions. These linkages cause the cellulose to have a high crystallinity and thus a low accessibility to enzymes or acid catalysts. Hemicellulose is an amorphous hetero-polymer which is easily hydrolyzed. Lignin, an aromatic three-dimensional polymer, is interspersed among the cellulose and hemicellulose within the plant fiber cell.

Although there are alternatives for effecting the release and hydrolysis of lignocellulose, such as enzymatic processes and processes employing extrusion or steam explosion, such processes are generally expensive.

SUMMARY

One objective of the present invention is to provide a cost effective process for the conversion of raw biomass into a stream of carbohydrates.

U.S. Pat. Nos. 5,562,777 and 5,580,389 describe processes for hydrolysing biomass to produce sugars by means of concentrated sulphuric acid hydrolysis. In these known processes a chromatographic technique is employed to separate the sulphuric acid from the other compounds, so that the other compounds can be processed further. By this technique, a dilute stream of sulphuric acid is obtained.

U.S. Pat. No. 3,244,620 describes a dialysis method for separating a strong acid from a mixture with a polymer by means of an anionic membrane.

US-A-2004/222157 describes a method for regenerating used acid by means of polymer membranes. The membranes preferably have anionic groups.

U.S. Pat. No. 2,276,210 describes a dialysis method for purifying inorganic oxyacids that are contaminated with organic contaminants. The dialysis is performed with a semi-permeable diffusion membrane.

It would be desirable to produce a sulphuric acid stream of high concentration, amongst others, because such a stream may be recycled more easily.

Furthermore, it would be desirable to provide a process for the conversion of raw biomass into a stream of carbohydrates which is more cost effective than the processes of the prior art.

Surprisingly it was found that it is possible to transport sulphate ions and also to some extent protons through anion selective membranes by diffusion at a sufficiently high transport rate, despite the fact that the slurry from which the sulphuric acid is to be removed may be rather viscous. Thus the present invention is directed to a process for removing sulphuric acid from a stream that contains a mixture of sulphuric acid and organic matter by means of a anion selective membrane.

The organic matter may include hydrocarbons (viz. compounds comprising H and C, and optionally O, N, P and/or S, etc.), in particular carbohydrates that result from the hydrolysis of lignocellulose; proteins; amino acids; lignin; lipids; and/or resins.

The cost-effectiveness of the process of the present invention is improved considerably compared to prior art processes as a result of the use of sulphuric acid having a high concentration, viz. usually higher than 65 wt. %, typically around 70 wt. %. With this concentration it is possible to carry out the release/hydrolysis at a relatively low temperature, viz. below 100° C. An additional advantage is that no, or only little, undesired by-products, such as furfural are formed. Furfural is known to be an inhibitor in fermentation processes.

BRIEF DESCRIPTION OF THE DRAWING

The foregoing and other features and advantages of the present invention will be more fully understood from the following description of an illustrative embodiment taken in conjunction with the following drawing in which.

DETAILED DESCRIPTION

Figure 1:
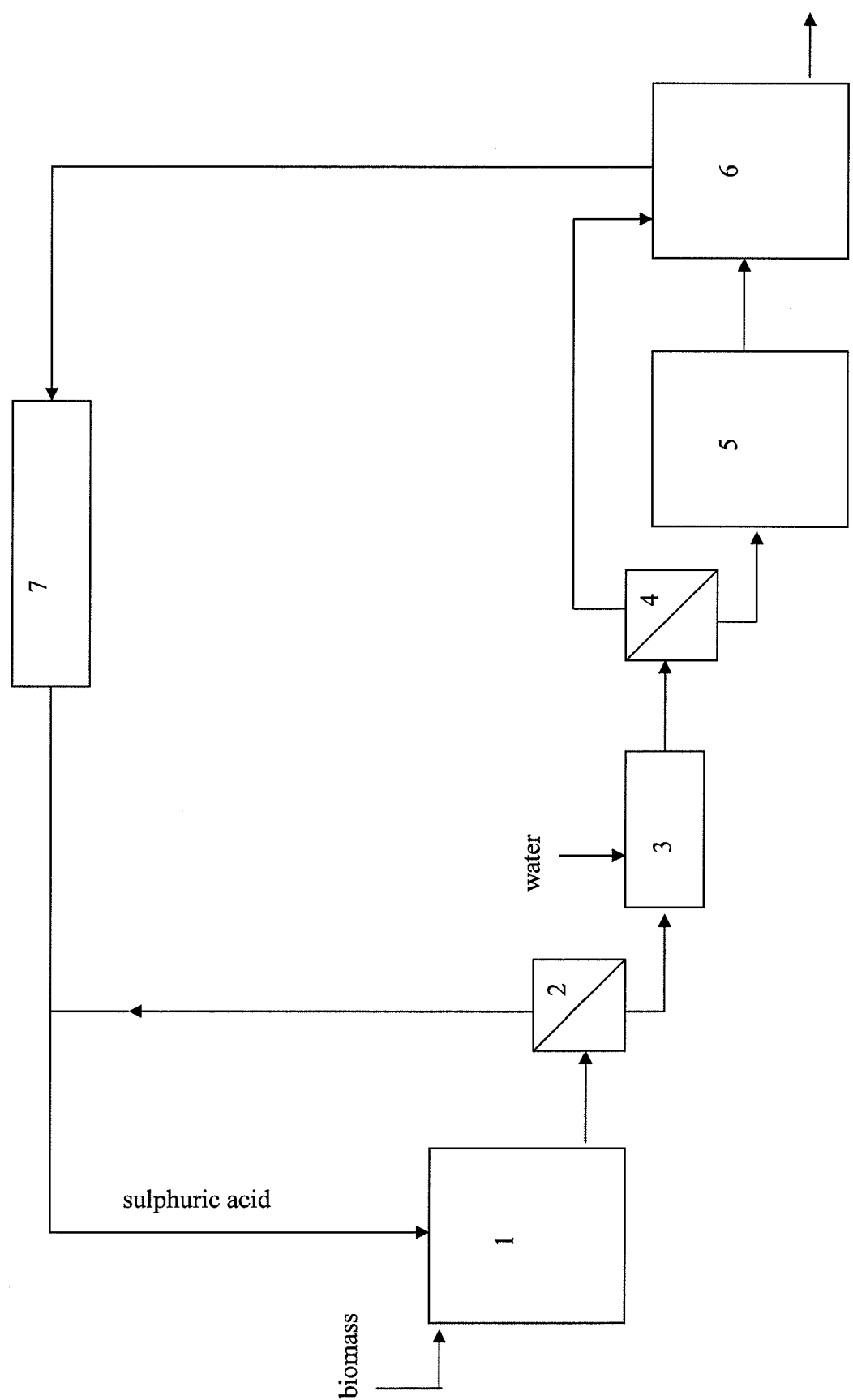
FIG. 1 schematically depicts an embodiment employing two membrane separation steps.

By employing the anion selective membrane in accordance with the present invention, the carbohydrates do not, or only to a small extent, pass the membrane and thus two separate streams are obtained; one stream rich in sulphuric acid and one stream rich in carbohydrates. The carbohydrate stream may be processed in a subsequent step, typically in a fermentation step. The sulphuric acid stream may be further processed to increase the concentration.

According to the invention, the obtained sulphuric acid stream is at least partly recycled, i.e. at least part of the obtained sulphuric acid stream is brought into contact with the biomass. Such a recycle stream further decreases costs and increases the efficiency of the conversion process of raw biomass to carbohydrates.

Furthermore, at least part of the sulphuric acid stream which is contacted with the biomass is obtained by burning $H_2S$. This results in an increase of sulphuric acid concentration which in turn allows for a lower hydrolysis temperature. Furthermore, the heat which is released during the burning step can be effectively used, for instance to dry wet biomass.

Preferably, the $H_2S$ is obtained from a sulphate reduction step that is applied to a stream that is obtained from the stream rich in sulphuric acid downstream of the anion selective membrane. Accordingly less fresh sulphuric acid is required, which further increases the efficiency of the sulphur cycle. Moreover, the amount of sulphate waste is reduced.

The driving force between the separation that is employed in the present invention is diffusion. The transport of sulphuric acid across the membrane may be effected by passing a receiving liquid (usually water) on the filtrate side of the membrane. Due to the concentration difference, the sulphuric acid passes the membrane. Preferably both streams, viz. the stream of the mixture comprising sulphuric acid and carbohydrates and the stream of the receiving liquid are operated in countercurrent. If countercurrent stream is employed, it is preferred to have the stream of receiving liquid (in particular water) flowing from the top to the bottom, because the density of the receiving liquid increases as it becomes more loaded with sulphuric acid and when flowing downwards, it is avoided that the heavier liquid mixes back with the lighter liquid. In this way a sulphuric acid stream can be produced at a flow rate that is about the same as the flow rate of the incoming mixture, whereas the concentration of sulphuric acid in the produced stream is close to that of the incoming slurry.

The stream of sulphuric acid that is produced in the membrane separation process may have a concentration that is sufficiently high to allow for direct recycling, e.g. in the treatment of lignocellulose to produce monosaccharides thereof. It may however also be desirable to increase the concentration. This can be done by means known per se, e.g. by adding $SO_3$ and/or concentrated sulphuric acid, by evaporation of water from the sulphuric acid. In a preferred embodiment, $SO_3$ and/or concentrated sulphuric acid is added that is obtained from burning $H_2S$, which is advantageously obtained from a sulphate reduction step, that can be situated downstream.

The anion selective membrane allows passage of sulphate ions. Because no negative charge can be build up on the receiving side of the membrane, co-migration of protons occurs, and thus in effect sulphuric acid is transported. This co-migration of protons is due to the small dimensions thereof. Larger cations, as well as other compounds, in particular the carbohydrates, cannot pass the membrane.

In accordance with the invention, a slurry e.g. a slurry from a step wherein lignocellulose is contacted with sulphuric acid, may be fed to the membrane separation step. The viscosity of such slurry may be high, which is a remarkable feature of the present invention and also advantageous, because it allows for working at relatively high concentrations. Typically, the viscosity of such slurries is about 1000 to 5000 mPa·s, typically around 1500 mPa·s. These values refer in particular to the initial viscosity of the slurry as it is contacted with the first membrane. If a second or further membrane is employed, the viscosities will generally be lower. Unless indicated differently, all viscosity values as expressed herein can be obtained using a Brookfield viscometer model RVF with 3 spindles and a spindle speed of 20 rpm at a temperature of 25° C.

Suitable membranes are those that are used for electrodialysis, e.g. Neosepta™ AFN diffusion membranes from Tokuyama. Suitable configurations for the membrane separation unit are (parallel) flat plates, as well as tubes, capillaries, spiral wound tubes, in which one fluid passes on the lumen side and the other passes on the outside.

When used in processing biomass, the membrane is preferably placed after a first contacting step with concentrated sulphuric acid, because the concentration of sulphuric acid is then relatively high.

If in a subsequent step water is added to improve hydrolysis the membrane can still be used with advantage in accordance with the present invention to separate sulphuric acid from the effluent of this step, but the benefits are less pronounced because the sulphuric acid concentration is lower.

In another embodiment two membranes are used in a process for producing fermentation products from lignocellulose. The second membrane is used to separate sulphuric acid from a stream that is obtained after hydrolysis of the biomass, i.e. a stream that is typically rich in monosaccharides. The advantage that is thus obtained is twofold. In the first place, the monosaccharides that are fed to the fermentor are more easily converted therein if the sulphuric acid concentration is low. Secondly, the stream of sulphuric acid (which is referred to herein as the "weak sulphuric acid stream", since it has a concentration that is lower than the stream that is obtained in the first membrane separation step) can be used with advantage in an anaerobic acidification and sulphate reduction step, in which a $H_2S$ stripper may be included, where usually a lower pH is required to promote $H_2S$ stripping. The materials and operating conditions for the second membrane can in principle be the same as those mentioned herein for the first membrane.

Generally, the product sulphuric acid stream of the first membrane separation step will have a pH of between −0.5 and −1.5, typically around −1.

The weak sulphuric acid stream from the second membrane module, if present, will usually contain water from the waste water treatment step and have a pH that is typically from 1 to 6.

As illustrated in FIG. 1, an embodiment employing two membrane separation steps can be arranged e.g. as follows. Biomass is fed to impregnation reactor 1, to which a stream of concentrated sulphuric acid (ca. 70 wt. %) is fed. This results in a product stream in the form of a slurry comprising polysaccharides, monosaccharides and sulphuric acid. This slurry is fed to a first membrane separation unit 2. The sulphuric acid passes the membrane. Normally it is taken up by a receiving fluid, such as water (not shown). The stream of sulphuric acid that is thus produced may be recycled to impregnation reactor 1, together with an auxiliary stream that is obtained from burning $H_2S$ in burning/catalytic converter unit 7. The $H_2S$ is obtained from a sulphate reduction step carried out in reactor 6. The slurry from membrane unit 2 is fed to hydrolysis reactor 3, to which also water is fed. Thus a stream is produced which comprises a considerable amount of monosaccharides. Before feeding this monosaccharide stream to a fermentor, which is depicted in FIG. 1 as combined fermentor/separator (e.g. distillation column) 5, it is advantageous to apply another membrane filtration step in membrane filtration unit 4. The waste water which is obtained after removal of the fermentation product (e.g. ethanol) from the fermentor/ethanol separator 5 is then fed to reactor 6. The sulphuric acid stream that is thus obtained can be used to obtain a sufficiently low pH in the anaerobic acidification and sulphate reduction step, that is carried out in reactor 6. Moreover, the fermentation process is positively influenced by a low sulphuric acid concentration. The product from the fermentor, which contains e.g. ethanol, is than fed to reactor 6, where the remaining sulphur compounds are removed. Optionally, the effluent from reactor 6 is post treated, e.g. by an anaerobic post treatment step (not shown). The desulphurized product stream may then be processed using conventional means, such as distillation (not shown).

The invention claimed is:

1. A process for recovery of sulphuric acid from a mixture comprising sulphuric acid and organic matter, comprising the step of contacting said mixture with an anion selective membrane, thus producing a sulphuric acid rich filtrate stream and a stream depleted in sulphuric acid, wherein said mixture originates from a contacting step wherein biomass is contacted with a fresh stream of sulphuric acid, and wherein said fresh stream of sulphuric acid is at least partly obtained from the filtrate that is obtained by said step of contacting said mixture with said anion selective membrane, and wherein said fresh stream of sulphuric acid further contains sulphuric acid that is obtained by burning $H_2S$.

2. The process according to claim 1, wherein said membrane is in a configuration of (parallel) flat plates, or as tubes, capillaries, spiral wound tubes, in which one fluid passes on the lumen side and the other passes on the outside.

3. The process according to claim 1, wherein the transport of sulphuric acid across said membrane is effected by passing a receiving liquid on the filtrate side of the membrane.

4. The process according to claim 3, wherein the receiving liquid is water.

5. The process according to claim 1, which is part of a process for the conversion of lignocellulose into fermentation products, in particular ethanol.

6. The process according to claim 1, wherein said mixture has a viscosity of from 1,000 to 5,000 mP·s, as measured using a Brookfield viscometer model RVF with 3 spindles and a spindle speed of 20 rpm at a temperature of 25° C.

7. The process according to claim 1, wherein a second membrane is used to separate sulphuric acid from a stream rich in monosaccharides, which is obtained after hydrolysis of said organic matter using sulphuric acid, thus producing a weak sulphuric acid stream, after which said stream rich in monosaccharides is fed to a fermentor and said weak sulphuric acid stream is fed to an anaerobic acidification and sulphate reduction step.

8. The process according to claim 1, wherein the $H_2S$ is obtained from a sulphate reduction step that is applied to a stream that is obtained from said stream depleted in sulphuric acid.

* * * * *

UNITED STATES PATENT AND TRADEMARK OFFICE
CERTIFICATE OF CORRECTION

PATENT NO. : 7,442,359 B2 Page 1 of 1
APPLICATION NO. : 11/837111
DATED : October 28, 2008
INVENTOR(S) : Johannes Wouterus Van Groenestijn et al.

It is certified that error appears in the above-identified patent and that said Letters Patent is hereby corrected as shown below:

On the cover page, item [73] Assignee:

"Nederlandse Organisatie voor Toegepast-Natuurwetenschappelijk Onderzoek TNO, Zoetermeer (NL)"

should be

--Nederlandse Organisatie voor Toegepast-Natuurwetenschappelijk Onderzoek TNO, Delft (NL)--.

and please add the second assignee:

--Techno Invent Ingenieursbureau voor Milieutechniek B.V., Zoetermeer, (NL)--.

Signed and Sealed this

Seventh Day of July, 2009

JOHN DOLL
*Acting Director of the United States Patent and Trademark Office*